J. HENNING.
SELF OILING DEVICE.
APPLICATION FILED MAR. 27, 1911.
1,026,952.
Patented May 21, 1912.
2 SHEETS—SHEET 1.
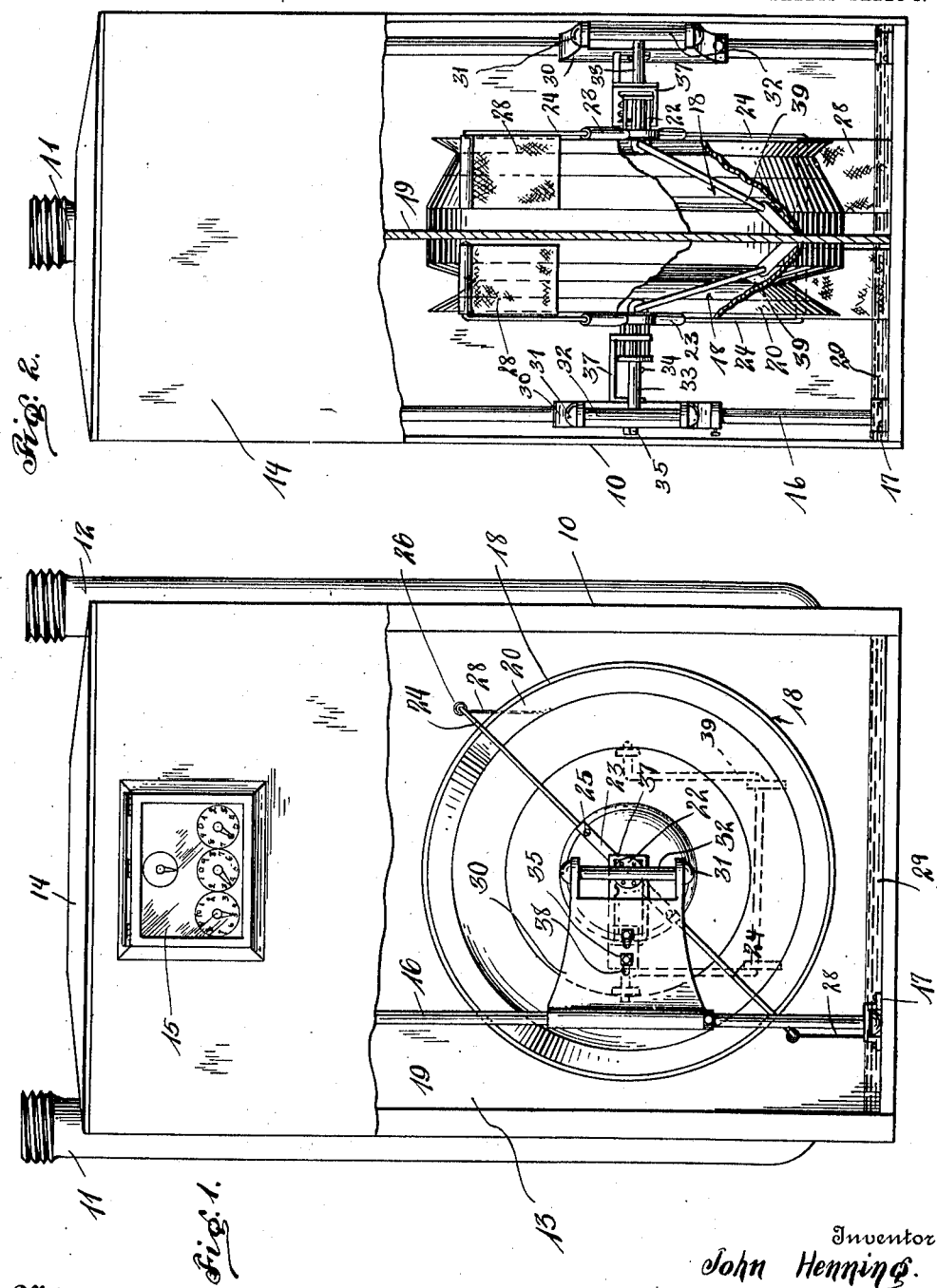
Witnesses
Ernest Crocker
J. E. Burch
Inventor
John Henning.
By 
Attorneys

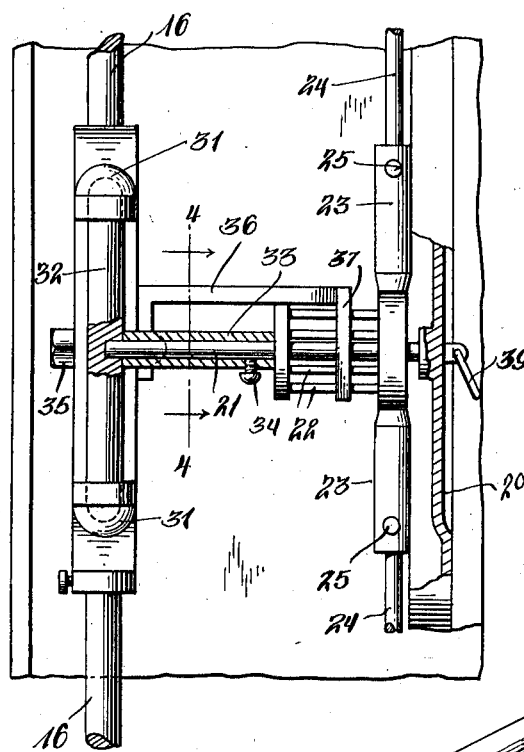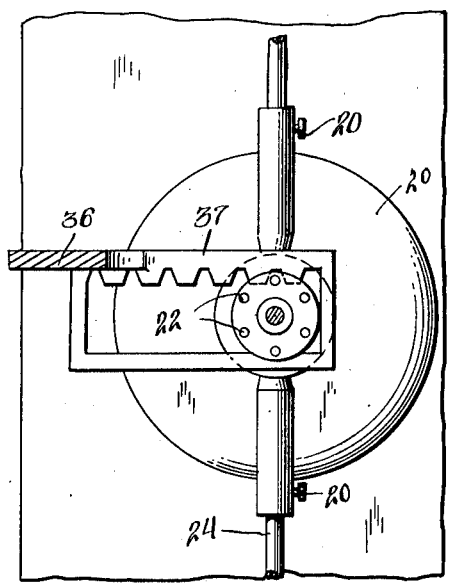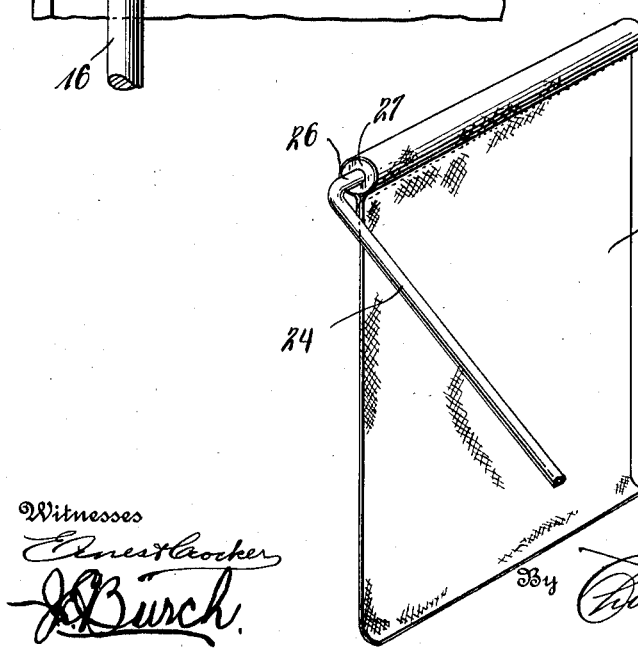

UNITED STATES PATENT OFFICE.

JOHN HENNING, OF AUGUSTA, GEORGIA, ASSIGNOR OF ONE-FOURTH TO M. D. SCHINDLER AND ONE-FOURTH TO GEORGE L. HATSEL, BOTH OF AUGUSTA, GEORGIA.

SELF-OILING DEVICE.

1,026,952.  Specification of Letters Patent.  Patented May 21, 1912.

Application filed March 27, 1911. Serial No. 617,105.

*To all whom it may concern:*

Be it known that I, JOHN HENNING, a citizen of the United States, residing at Augusta, in the county of Richmond, State of Georgia, have invented certain new and useful Improvements in Self-Oiling Devices; and I do hereby declare the following to be a full, clear, and exact description of the invention, such as will enable others skilled in the art to which it appertains to make and use the same.

This invention relates to new and useful improvements in self oiling devices for gas meter diaphragms and the object of the invention is to provide a mechanism operated by the action of the diaphragms in their action of receiving and discharging gas, in which they are expanded and contracted, so that the diaphragms will be continuously oiled.

The specific purpose of this device is to provide a pair of rotating arms, each carrying a suitable brush or oiling member so as to evenly distribute the oil over the diaphragms, thus keeping them constantly oiled for preventing porous, bleached, stiffened and cracked leathers so as to give longer life to the diaphragm, reducing the cost of repairs necessary for their operation and to insure accurate measuring of the gas.

The invention consists of certain other combinations and arrangements of parts, as will be hereinafter more fully described and clearly specified in the appended claims.

In the drawings:—Figure 1 is a front elevation of the meter with the casing part removed from the measuring chamber. Fig. 2 is a side elevation of the meter with part of one of the sides of the casing removed. Fig. 3 is a detailed side elevation of the operating mechanism for the oiling device, and showing its connection with the flag wire of the operating mechanism. Fig. 4 is a sectional view thereof on the line 4—4 of Fig. 3, looking in the direction indicated by the arrows. Fig. 5 is a detail perspective view of one of the oiling members and part of its carrying arm.

Referring to the drawings in detail, there is shown a gas meter of ordinary construction and which comprises a casing 10 having the usual inlet 11 and the outlet 12 for gas, leading from the main and adapted for connection with pipes for use as desired after passing through the meter. The casing 10 is divided in the usual manner to form the measuring chamber 13 and indicating chamber 14 which contains the usual mechanism for operating the valves and controlling the entrance and discharge of gas and is also provided with an indicator 15 in the usual manner.

Leading from the chamber 14 and having connection with the valve operating mechanism are operating members or flag wires 16 which are rotatably mounted at their lower ends in suitable brackets 17 so that they may be permitted to rotate. A pair of diaphragms 18 which are usually formed of leather, are secured to a partition wall 19 for opposite movement in the act of expanding and contracting during the admission and release of the pressure of the gas or air therein and secured to the outer portions of each of the diaphragms is a disk 20, preferably of metal and which are secured to the diaphragms in such a manner as to prevent the escape of gas. Each of the diaphragms 18 is spaced from the casing so as to permit proper mounting of the oiling device which comprises a shaft 21 which is secured at the center of each disk and which rotatably carries a pinion 22 formed with a pair of oppositely extended sockets 23. Each of these sockets receives a brush arm 24 which is adjustably and detachably mounted therein through the medium of a set screw 25 and said arms are directed inwardly at their extremities as shown at 26 to extend over diametrically opposite points of the diaphragms, said arms 26 carrying suitable sleeves 27 upon each of which is swiveled an oiling member 28 which is formed of a piece of silk, and which is adapted to take up oil from the bottom of the casing as indicated at 29 in Fig. 2 of the drawings and to distribute the same over the diaphragm in a manner now to be described.

To each of the flag wires 16 is secured an arm 30 in the form of a plate and which at its upper and lower free edges is formed with extended cup shaped bearings 31 for pivotally receiving a rock shaft 32 which is connected to the shaft 21. A sleeve 33 is mounted upon each of the shafts 21 between the pinion 22 and the rock shaft 32 so as to hold the pinion normally adjacent the disk 20 but to allow sufficient room to permit rotation thereof without friction. The sleeves 33 are held to the shafts by set screws 34 so as to prevent longitudinal movement thereof and to insure rotation of the arms 24 at a uniform distance from the disk of each diaphragm, and the rock shaft 32 prevents outward displacement of the sleeve as will be readily apparent. Secured to the inner face of the arms 30 by means of bolts or the like 35 is a bracket 36, which at its outer end is formed with a horizontal rack bar 37 adapted for engagement with the teeth of the pinion 22 and in order to permit adjustment of the rack bar 37 for proper rotation of the arms 24 and the oil distributing members 28, each of the plates forming the arm 30 is provided with slots 38 so that said bolts may be adjusted transversely to permit the engagement of the rack bar with the pinion at the proper point.

In the operation of the device, the admission of gas or air to the diaphragms forces the disks 20 outwardly to cause the shafts 21 to exert force upon the rock shafts 32, said latter shafts being thus given a rocking motion to swing the rock arms 30 outwardly and thus operate the flag wires 16 to operate the valve and indicator mechanism in the usual manner. During this operation, the movement of the rock arms 30 will carry the brackets 36 to swing the same in the arc of a circle and move the rack bars 37 over the pinions 22 to cause a rotation thereof for half a revolution upon the shafts 21. In this operation the oil distributing cloths or members 28 will be moved around the diaphragms to thoroughly distribute the oil taken up from the bottom of a casing over the diaphragms and thus keep them thoroughly oiled, it being preferable that sufficient oil be distributed to equal the amount which is extracted by the gas in passing through the diaphragms. In the reverse movement of the diaphragms in discharging the gas, the arms 24 and the oil distributing members are revolved half-way around the diaphragm in the opposite direction so that each member or brush is in turn saturated with oil as it leaves the bottom of the meter or casing and in this manner is kept thoroughly oiled.

From the foregoing description it will be apparent that with the use of this device the diaphragm must not touch the casing at any part, so that the oil distributing members will properly move between the diaphragms and the casing, and the guide wires 39 which are placed on an ordinary meter on the outside are in this style of meter placed on the inside of the diaphragm to insure the disk making a straight forward and inward motion.

In practical use the device will be operated and the diaphragm thoroughly saturated with oil on the passage of from 10 and 15 feet of gas or air through the meter and sufficient oil may be retained in the bottom of the meter to last for several years thus rendering the meter self oiling throughout the period of its ordinary use and it will be further apparent that the diaphragms will be absolutely prevented from becoming incapacitated for proper action in receiving and discharging the gas, avoiding leaks and thus insuring accurate measurements.

I claim:—

1. An oiling device of the character described comprising the combination with a diaphragm, and an adjacent operating member; of a shaft secured centrally of the diaphragm, a series of arms rotatably carried by the shaft, operative connections between the shaft and the operating member aforesaid to support said shaft, and connections between the operating member and the arms to rotate the same, the extremities of said arms being adapted for distributing a lubricant over the diaphragm.

2. In an oiling device, the combination with a diaphragm, an adjacent rockable operating member and a suitable valve operating mechanism controlling the passage of gas to and from the diaphragm; of a rock arm carried by said rockable member, a disk secured to the diaphragm, a connecting means between the rock arm and the disk to cause operation of the rockable member, and means rotatably carried by the shaft and connected to said rock arm to distribute oil over the diaphragm.

3. In a self oiling device, the combination with a casing, diaphragms mounted within the casing, valves controlling the passage of gas to and from the diaphragms, flag wires connected to the valves, swiveled connecting means between the flag wires and the diaphragms, oil distributing members extending over the diaphragms, means rotatably mounted upon said connecting means for supporting said members, said oil distributing members being adapted to take up oil from the bottom of the casing and connecting means between said distributing members and the swiveled connecting means to rotate said distributing members.

4. An oil distributing device for diaphragms comprising the combination with a meter casing; of flag wires rotatably mounted, rock arms carried by the flag wires, shafts secured to movable ends of the diaphragms, pinions mounted upon the shafts for rotation, sockets formed with said pinions, arms carried by the sockets, oil distributing members carried by the ends of the arms and adapted to be in contact with the diaphragms, said distributing members being adapted to take up oil from a suitable source and brackets secured to the rock arms and formed with rack bars adapted to engage the pinions to rotate said arms and distributing members carried thereby, upon the expansion and contraction of the diaphragms.

5. A device of the class described comprising the combination with a diaphragm of oppositely extended arms rotatably mounted centrally of one end of the diaphragm, and means for rotating said arms during the expansion and contraction of the diaphragm, said arms carrying oil distributing members.

6. In an oiling device for gas meters, the combination with a pair of diaphragms having movable portions and a common partition wall to which said diaphragms are secured; of shafts secured to the movable portions of the diaphragms, sockets rotatably mounted on the shafts, arms adjustable therein and oil distributing members swiveled upon the ends of the arms in contact with the diaphragms, said members being adapted to alternately distribute oil over the diaphragms from the bottom of the meter.

In testimony whereof, I affix my signature, in presence of two witnesses.

JOHN HENNING.

Witnesses:
E. REYNOLDS,
SIM HARRIS.

Copies of this patent may be obtained for five cents each, by addressing the "Commissioner of Patents, Washington, D. C."